E. HAGENMÜLLER.
DEVICE FOR THE AUTOMATIC SHARPENING OF THE PERFORATED DISKS AND CROSS KNIVES OF CUTTING SETS, &c.
APPLICATION FILED MAY 28, 1913.
1,165,873.
Patented Dec. 28, 1915.
3 SHEETS—SHEET 2.
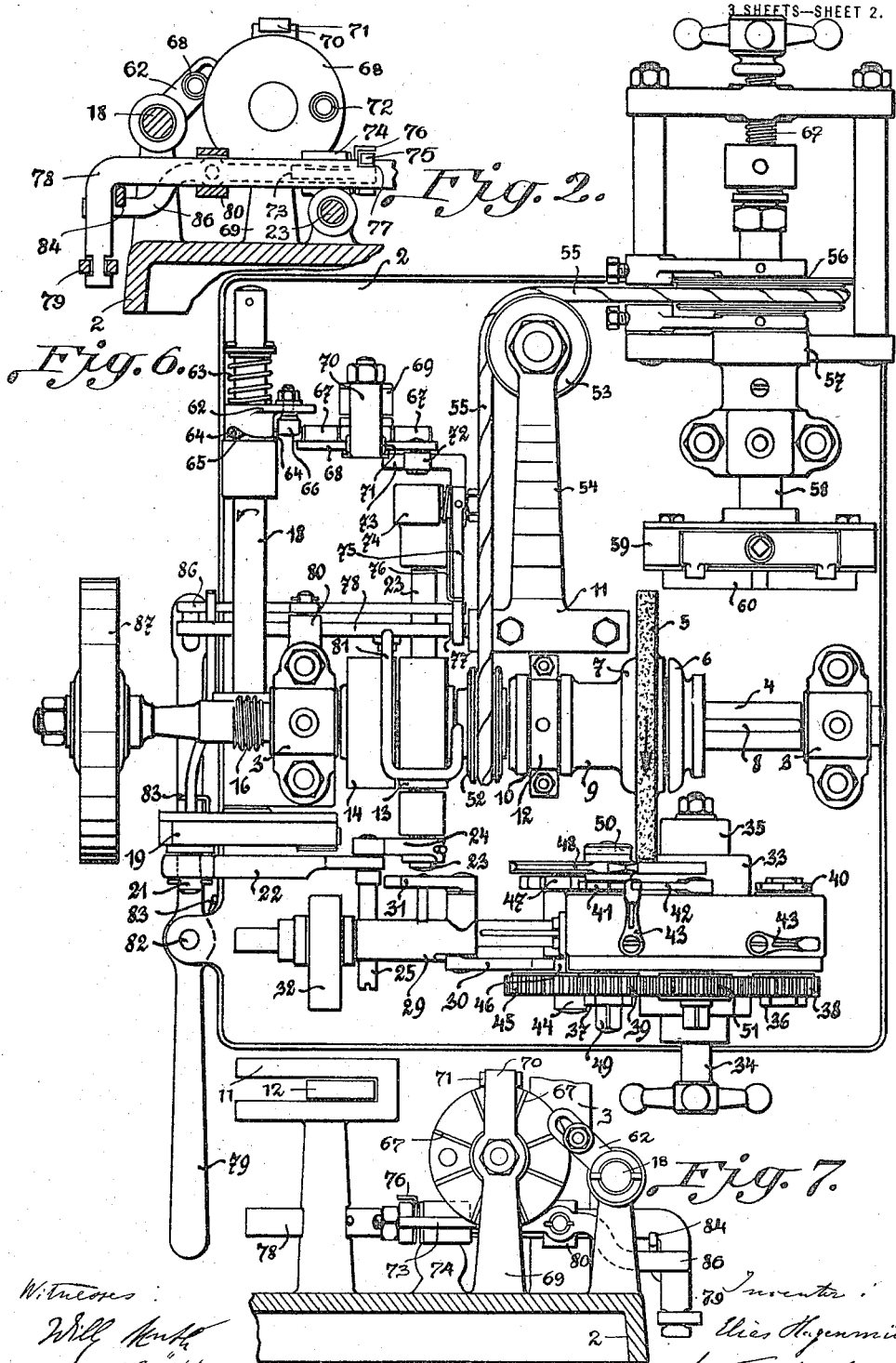

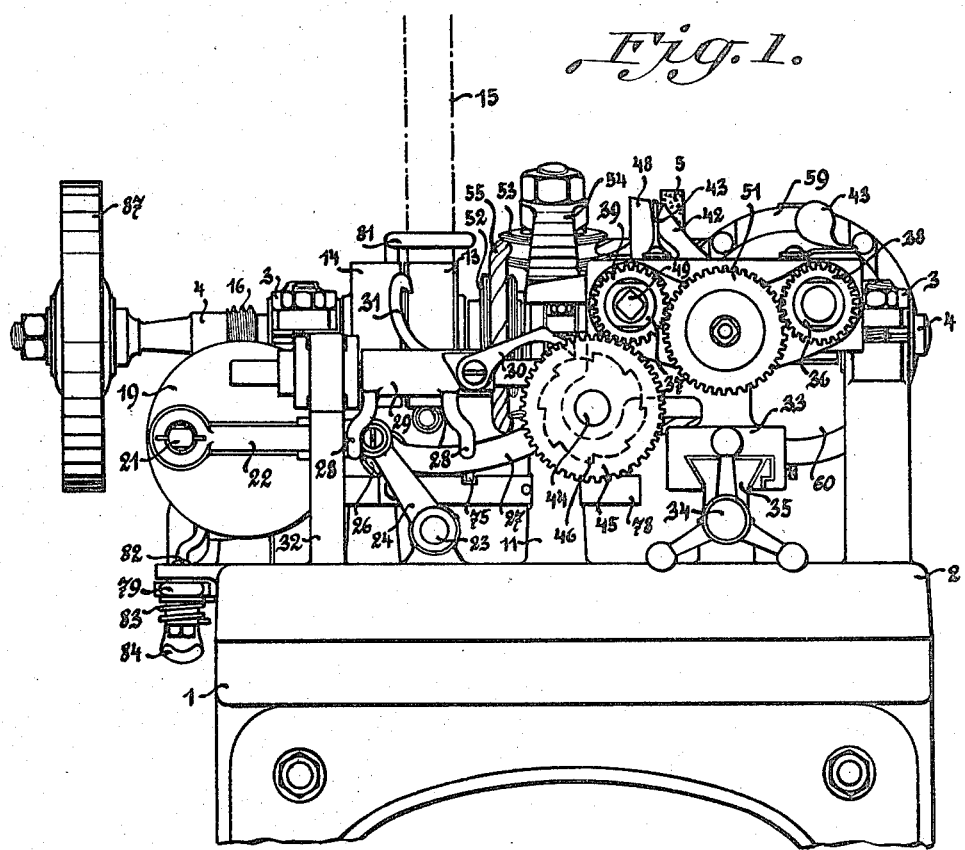

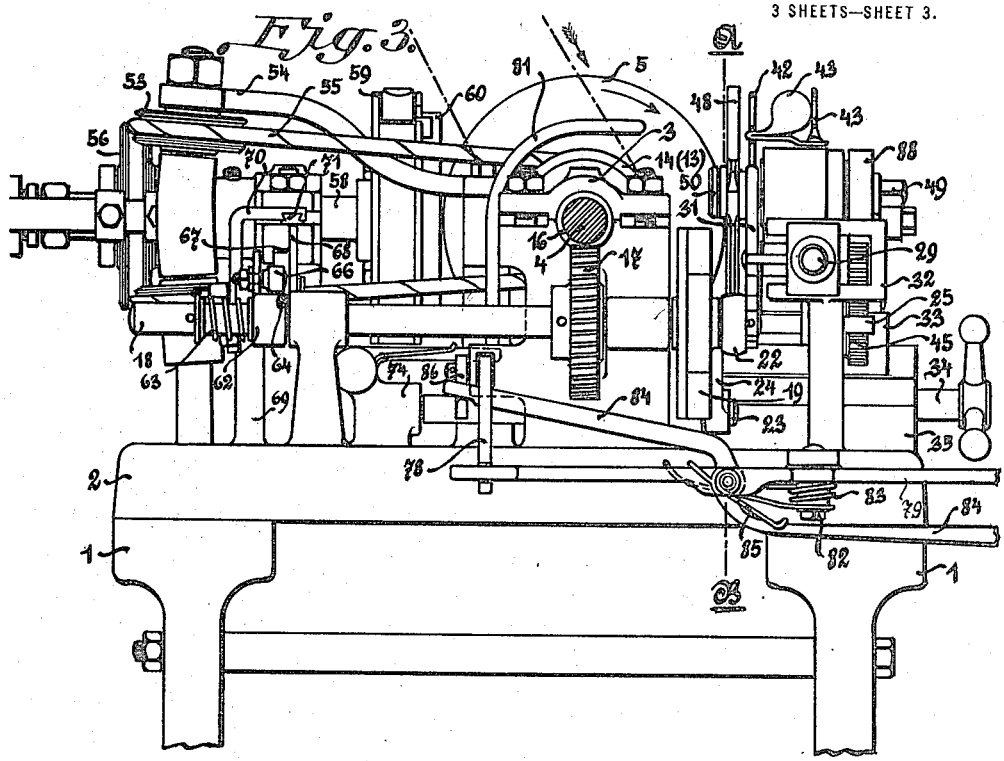

UNITED STATES PATENT OFFICE.

ELIAS HAGENMÜLLER, OF FÜRTH, GERMANY.

DEVICE FOR THE AUTOMATIC SHARPENING OF THE PERFORATED DISKS AND CROSS-KNIVES OF CUTTING SETS, &c.

1,165,873.

Specification of Letters Patent.

Patented Dec. 28, 1915.

Application filed May 23, 1913. Serial No. 770,542.

*To all whom it may concern:*

Be it known that I, ELIAS HAGENMÜLLER, a subject of the Austro-Hungarian Emperor, residing at Fürth, in the Kingdom of Bavaria, German Empire, have invented certain new and useful improvements in devices for the automatic sharpening of the perforated disks and cross-knives of cutting sets for meat-cutting machines and similar machines, of which the following is a specification.

This invention relates to a device for the automatic sharpening of one perforated disk and of one cross knife of a cutting set of meat cutting machine which requires so little attention that one person can attend at the same time several such devices, owing to the fact that only the putting in and taking out of the perforated disk and of the cross knife has to be effected by hand.

According to the invention the perforated disk is mounted upon an axle at one side of the grinding disk which is movably mounted upon a horizontal shaft, the cross knife being arranged at the other side of said horizontal shaft so that its position with regard to the grinding disk can be regulated. When the shaft of the grinding disk is put in motion the grinding disk itself is moved to and fro upon this shaft by means of a crank disk driven from this shaft and through the intermediary of a lever system controlled by said crank disk. At the same time the perforated disk is rotated from the shaft of the grinding disk through a transmission gear and a partial rotating motion is communicated from the lever system to the cross knife so that the perforated disk and the cross knife are simultaneously and automatically sharpened when the grinding disk is being displaced.

In the accompanying drawings the improved machine is shown by way of example.

Figure 1 is a front elevation. Fig. 2 a plan view. Fig. 3 a side elevation. Figs. 4 and 5 are sections on the line A—B of Fig. 3 seen from the left and right respectively. Fig. 6 is a side elevation of the ratchet disk and of the parts connected with the same. Fig. 7 is a side elevation of the ratchet disk seen in a direction opposite to that in which Fig. 6 is seen.

Over a base plate 2 fixed upon supports 1 a horizontal shaft 4 is mounted in upright bearings 3. The clamping jaws 6—7 between which the grinding disk 5 is removably mounted are connected with said shaft by keys 8 so that they turn with the shaft but can move upon the same in longitudinal direction. The left clamping jaw 7 has an extension 9 with a circular groove 10 with which engages a guide ring 12 guided in a support 11 arranged at the side of the shaft 4 (Figs. 2 and 4). The shaft 4 carries a fixed pulley and a loose pulley 13, 14 and it is driven from a convenient transmission by means of the belt 15. The shaft 4 is further connected by a worm and worm wheel gear 16, 17 with a lower vertical shaft 18, said gear being calculated in such a manner that a disk 19 fixed upon the front end of the shaft 18 executes one revolution during the time in which the shaft executes several revolutions (Figs. 2 and 4). A crank pin 21 is fixed upon the disk 19 by means of a screw bolt 20 eccentrically to the shaft 18. A connecting rod 22 pivotally mounted with one end upon the crank pin 21 is linked by means of a pin 25 (Figs. 1 and 2) with a lever arm 24 mounted upon an axle 23. Another arm 26 mounted upon the axle 23 is connected by means of a link 27 with the guide rod 12 whereby the rotating movement of the crank disk 19 is transformed into a reciprocating motion of the grinding disk 5 (Figs. 1 and 4). The pin 25 acts against abutments 28 of a sleeve like slide 29 when the arm 24 oscillates. This sleeve like slide 29 has lateral pawls 30, 31. The support of the sleeve like slide 29 is mounted on the one hand in the horizontal slot of a support 32 and further fixed to a carriage 33 (Fig. 5) adapted to move perpendicular to the shaft 4 (Fig. 5). This carriage 33 is guided by means of a screw spindle 34 upon a support 35 and it carries sleeves 36, 37 upon which toothed wheels 38, 39 and further ratchet wheels 40—41 are arranged which are adapted to be maintained in their position by means of a reversible ratchet 42 arranged between said sleeves. Upon the carriage 33 blade springs 43 are fixed which act upon the ratchet 42 when the same is at the left hand side or at the right hand side position (Figs. 2 and 5). Below the toothed wheels 38, 39 and engaging with the toothed wheel 39 a toothed wheel 35 is arranged which is keyed upon a shaft 44 mounted upon the carriage 33 and which further carries two ratchet wheels 46, 47 with which the pawls 30, 31 of the slide 29 can engage (Figs. 1, 2 and 5). The cross knife 48 is placed upon one of the sleeves 36, 37 according to whether its front edge or its rear edge is to be sharpened, a bolt 49 to be inserted from the front and a nut 50 placed upon the cross knife serving for securing the same in position.

Owing to the fact that always the larger side of the knife arm which has the cutting edge must be turned up as the grinding disk 5 rotates in the direction of the arrow (Fig. 3) and as the whetting has to be done against the edge, the cross knife must either be placed upon the one or upon the other of said sleeves. If a small knife edge has to be obtained the middle of the sleeves must be situated slightly beyond the axis of the grinding disk (Figs. 1 and 3). The toothed wheels 38—39 are connected the one with the other by an intermediary toothed wheel 51 (Figs. 1 and 2.) Upon the shaft 4 between the grinding disk 5 and the belt pulley 13 a roller 52 is fixed which is connected with a roller 56 by means of a twisted endless belt 55 guided over disks 53 mounted in the upper end of an arm 56, said roller 56 being mounted upon an axle 58 arranged at the same height and at right angles to the shaft 4 in a support 57 (Figs. 2 and 3). A chuck 59 screwed upon the front end of the axle 58 is designed for clamping in the perforated disk 60 the rear end of said axle being connected with a screw spindle 61 so that the chuck 59 and with it the perforated disk 60 can be adjusted according to the diameter of the grinding disk 5.

The distances between the middle of the sleeves and the median position of the grinding disk are equal and the cross knife 48 can be adjusted with regard to the grinding disk and according to the diameter of the same by means of the spindle 34. The shaft 18 further carries a lever arm 62, the hub of which is pressed upon radial abutment pins 64 of the shaft 18 by means of a spiral spring 13 so that the notches 65 of said hub engage with said abutment pins, the arm being able only to be turned to the left of 180° at a time (Figs. 2, 6 and 7). The arm 62 carries a roller 66 the position of which with regard to the shaft 18 can be regulated, said roller engaging after every revolution of the shaft 18, with a ratchet wheel 68 provided with radial ribs 67 against which said roller bears so that the ratchet disk 68 is turned (Figs. 2, 6 and 7). The ratchet disk 68 is rotatably mounted in a support 69 upon which a bridge 70 is fixed which rides upon said ratchet disk 68 and carries a brake-shoe 71 for braking said disk (Figs. 2, 6 and 7). Upon the front surface of the ratchet disk 68, eccentrically with regard to its axis, a roller 72 is mounted which, for example after eight part revolutions of the ratchet disk 68, bears against an angle lever 73 (Figs. 2, 6 and 7) pivotally mounted upon a support 74. The straight front arm 75 of this lever is pressed through the action of a spiral spring 76 into a notch 77 of a curved rail 78 adjusted in horizontal direction, this engagement being effected when said rail is moved toward the right (Figs. 2 and 6) by means of the two-armed hand lever 79 pivotally mounted upon a vertical axle 82. The rail 78 is guided, on the one hand, in the support 11 and, on the other hand, in an arm 80 of one of the supports 3 of the shaft 4 and it carries an arm 81 extending upwardly over the belt pulleys 13, 14 and designed to shift the belt 15 from the fixed pulley upon the loose pulley and vice versa (Figs. 1, 2 and 3). The inner arm of the hand-lever 79 is under the influence of a spiral spring 83 wound around its pivot 82 so that it oscillates to the left after the angle lever 73 has been lifted whereby the belt is shifted to the loose pulley 14, the grinding device being thus thrown out of gear (Figs. 1, 2 and 3). The release of the angle lever 73 is either effected automatically after a determined time by means of the roller 72 of the ratchet disk 68 or by hand by means of a lever 84 pivotally mounted upon and projecting through a horizontal bolt of the hand lever 79 the outer arm of which is held down by means of a spring 85, its inner arm bearing against the left arm of another oscillating lever 86 so that, if the handle of the lever 84 is lifted, the left arm of the lever 86 goes down and its right arm, which is situated under the arm 75 of the angle lever 73, goes up and lifts said angle lever 73 from out of the notch 77 (Figs. 2, 3, 6 and 7). Upon the left hand end of the shaft 8 a polishing disk 87 can be arranged. The toothed wheel gearing 38, 39, 45 and 51 is preferably covered by a lid 88 (Fig. 3).

This sharpening device operates in the following manner:—If the grinding disk 5 is at the left hand end position the perforated disk 60 can be placed upon the chuck 59 in the manner shown in Fig. 2 and the cross knife 48 can be placed upon the left sleeve 37 whereupon the belt 15 is shifted by means of the hand lever 79 upon the fixed pulley 13, the arm 75 of the curved lever 73 engaging with the notch 77 of the rail 78 whereby the grinding disk 5 is rotated in the direction of the arrow (Fig. 3). This rotating movement is transmitted from the grinding disk shaft 4 through the worm gear 16, 17 upon the shaft 18 and the crank disk 19 and from there by the lever system 22, 24 upon the axle 23 which executes only partial oscillations which are transmitted by the lever 26 and the link 27 to the guide ring 12 whereby the grinding disk 5 is moved toward the right; the grinding disk thus does not only sharpen the one of the cutting arms of the cross knife 48 but also the perforated disk 60 which has been properly adjusted. When the grinding disk 5, moving toward the right, goes away from the cross knife 48, the slide 29 is pushed to the right through the intermediary of the hinged pin 25 of the lever system 22, 24, the pawl 30 of said slide engaging with the ratchet wheel 46 and partially rotates this ratchet wheel with the toothed wheel 45 and the toothed wheel gear 39, 51 and 38 whereby the sleeve 37 connected with the toothed wheel 39 and consequently the cross knife 48 are also turned to the left for a quarter of a revolution (Fig. 1). If now the grinding disk 5 goes back to its normal position, the next following arm of the knife is sharpened. The knife 48 is maintained in its new position by means of the pawl 42 engaging with the ratchet wheel 41. During the rotation and the displacement of the grinding disk 5 the perforated disk 60 is rotated to the left from the main shaft 4 through the intermediary of the twisted belt 55 so that the grinding disk 5 and the perforated disk 60 rotate in opposite directions at the point where they are in contact, the grinding action being thus increased. When the grinding disk 5 goes back to its normal position the slide 29 is moved to the left so that its pawl 30 engages with the next following tooth of the ratchet wheel 46. This reciprocating position of the grinding disk 5, and the rotation of the crank disk 19 can take place, for example, eight times so that each arm of the cross knife 48 is sharpened twice, this sharpening being regulated by means of the ratchet disk 68 which has eight ribs 67, the lever 62, mounted upon the shaft 18, acting after each rotation of the crank disk 19 upon one of the ribs 67 of the ratchet disk 68 which is thus turned for $\frac{1}{8}$ of a revolution. The ratchet disk 68 which has been previously adjusted properly, lowers the angle lever 73 through the intermediary of its roller 72 at the 8th part rotation so that the arm 75 of this angle lever 73 releases the rail 78 which is moved toward the left by the spring influenced hand lever 79 so that the belt 15 is shifted upon the loose pulley whereby the grinding device is automatically thrown out of gear.

In order to sharpen the other sides of the perforated disk 60 and of the cross knife 48 the perforated disk 60 is reversed in the chuck 59 and the cross knife 48 is screwed upon the right sleeve 36 whereupon the pawl 30 is brought out of gear, the pawl 31 being thrown in gear so that the slide 29, when it is moved to the left, makes the cross knife 48 turn to the left. This turning of the cross knife must take place at the left hand end position of the grinding disk 5 for which purpose the lever 62 has to be moved to the left for 180°, that is to say, for one half revolution so that the throwing out of gear of the grinding device takes place when the grinding disk 5 reaches its left end position, the perforated disk 60 and the cross knife 48 being then accessible to be reversed or to be removed. In order to securely maintain the cross knife 48 at each new position upon the sleeve 36 the pawl 42 has to be lowered so that it engages with the ratchet wheel 40 whereupon the hand lever 79 is moved to the left and the belt 15 shifted to the fixed pulley 13; the grinding device begins to work.

This grinding device offers the great advantage that it works absolutely automatical after the perforated disk and the cross knife have been put in place and after the pawls 30, 31 and 42 have been reversed and the lever 62 has been turned, the machine being stopped automatically after a certain time so that one person can attend at the same time to several of such grinding devices as there are only very few manipulations required which demand little time. If the knife, after having been twice ground, should not be completely sharpened it is merely necessary to throw the shifting device in gear again and to repeat this until the edge of the knife is properly sharpened.

I claim:—

1. A device for the automatical grinding of the perforated disks and cross knives of the cutting sets of meat cutting machines and similar cutting machines, comprising in combination a horizontal shaft, a grinding disk adapted to be displaced on said horizontal shaft, a perforated disk mounted at one side of said grinding disk so that its perpendicular position with regard to the shaft of the grinding disk can be regulated, an adjustable axle on which said perforated disk is mounted, a carriage at the other side of said main shaft, a cross knife mounted on said carriage, a spindle of the perforated disk, a twisted belt transmission for driving said spindle from said grinding disk shaft, a crank gear operated from said main shaft and a system of hinged levers designed to displace said grinding disk on said main shaft, a ratchet and ratchet wheel system for turning said cross knife through a quarter revolution, a connecting rod eccentrically mounted on said crank gear designed to operate said ratchet wheel system, substantially as described and shown and for the purpose set forth.

2. A device for the automatical grinding of the perforated disks and cross knives of the cutting sets of meat cutting machines and similar cutting machines comprising in combination a main shaft, a grinding disk movably mounted on said main shaft, two sleeves on said carriage at a short distance above said main shaft and at equal distances from the middle plane of the median position of said grinding disk, a carriage mounted movably on said main shaft, a cross-knife mounted on the one or on the other of said sleeves, according to whether the one or the other of its surfaces has to be ground, a sleeve like slide connected with said carriage, a crank gear for operating said sleeve like slide, a finger-shaped pawl pivotally mounted on said sleeve like slide, a hook-shaped pawl pivotally mounted on said sleeve like slide, ratchet wheels on said two sleeves adapted to be operated by the one or the other of said pawls, toothed wheels on said two sleeves, a tool holder adapted to be rotated by said toothed wheels once at the forward movement and again at the return of said slide either at the right or at the left end position of said grinding disk in the same direction (left) for one part revolution, and a reversible pawl engaging with one of the said two ratchet wheels of the working sleeve for maintaining the same after each partial revolution.

3. A device for the automatical grinding of the perforated disks and cross knives of the cutting sets of meat cutting machines and similar cutting machines, comprising in combination a main shaft, an auxiliary shaft parallel with said main shaft, a crank disk on said auxiliary shaft, a lever mounted on said auxiliary shaft so that it can be turned upon said shaft in the direction of rotation of the same (to the left), a ratchet disk having radial ribs and acted upon by said lever at each revolution of the auxiliary shaft so that said disk is partially turned, an angle lever arranged so that it is operated by said ratchet disk after a number of partial rotations corresponding with the number of blades of the cross knife, a spring influenced rail for the driving belt of the main shaft adapted to be released by means of said angle lever so that the machine is stopped and through the oscillation of said lever upon said auxiliary shaft through 180° the moment of the throwing out of gear is varied so that it takes place either when the grinding disk has reached the right end position or the left end position, substantially as described and shown and for the purpose set forth.

In testimony whereof I have hereunto set my hand in the presence of two witnesses.

ELIAS HAGENMÜLLER.

Witnesses:
 A. HEERLEIN,
 OSCAR BOCK.

Copies of this patent may be obtained for five cents each, by addressing the "Commissioner of Patents, Washington, D. C."